United States Patent [19]

Saruyama et al.

[11] Patent Number: 5,153,160
[45] Date of Patent: Oct. 6, 1992

[54] METHOD FOR PREPARING MICROPARTICLES OF A THERMOPLASTIC RESIN CONTAINING AN ENCAPSULATED HYDROSILYLATION REACTION CATALYST

[75] Inventors: Toshio Saruyama; Teruyuki Nakagawa; Toyohiko Yamadera; Atsushi Togashi, all of Chiba, Japan

[73] Assignee: Dow Corning Toray Silicone Company, Ltd., Tokyo, Japan

[21] Appl. No.: 703,955

[22] Filed: May 22, 1991

[30] Foreign Application Priority Data

May 24, 1990 [JP] Japan .................................. 2-134729

[51] Int. Cl.⁵ .............................................. B01J 31/06
[52] U.S. Cl. ........................................ 502/159; 502/9; 502/152
[58] Field of Search .................... 502/9, 152, 159

[56] References Cited

U.S. PATENT DOCUMENTS

| | | | |
|---|---|---|---|
| 3,888,974 | 6/1975 | Stevens | 502/159 X |
| 3,909,444 | 9/1975 | Anderson et al. | 502/159 X |
| 3,981,976 | 9/1976 | Stevens | 502/159 X |
| 4,089,800 | 5/1978 | Temple | 502/159 X |
| 4,131,542 | 12/1978 | Bergna et al. | 502/9 X |
| 4,268,411 | 5/1981 | Iwata et al. | 502/9 X |
| 4,600,484 | 7/1986 | Drahnak | 502/152 X |
| 4,847,228 | 7/1989 | Saruyama | 502/152 X |
| 5,077,249 | 12/1991 | Lee et al. | 502/159 X |

Primary Examiner—Patrick P. Garvin
Attorney, Agent, or Firm—Robert Spector

[57] ABSTRACT

Microparticles of a hydrosilylation catalyst encapsulated in a thermoplastic resin are prepared by forming a solution containing the hydrosilylation catalyst and a thermoplastic resin with a glass-transition temperature or softening point of 40° to 200° C. dissolved in a solvent, and then spraying this solution as droplets into a hot gas current in order to volatilize the solvent while solidifying said thermoplastic resin during entrainment of the droplets in the gas current.

5 Claims, No Drawings

METHOD FOR PREPARING MICROPARTICLES OF A THERMOPLASTIC RESIN CONTAINING AN ENCAPSULATED HYDROSILYLATION REACTION CATALYST

BACKGROUND OF THE INVENTION

1. Field of the Invention

The present invention relates to a method for preparing microparticles containing an encapsulated catalyst for hydrosilylation reactions. More particularly, the present invention relates to a method for preparing these microparticles in a form that can be effectively used as a hydrosilylation-reaction catalyst because the catalytic activity of the microparticles is inhibited at temperatures below the softening point of the thermoplastic resin, and only becomes evident at temperatures at or above the softening point of the resin.

2. Background Information

Hydrosilylation is one of a limited number of reactions resulting in silicon-carbon bond formation. This reaction is therefore widely used for synthesizing organosilicon compounds and for crosslinking or curing silicone elastomer compositions.

A disadvantage of hydrosilylation is the ability of this reaction to occur at room temperature in the presence of extremely small amounts of a hydrosilylation catalyst. Maintaining hydrosilylation reaction mixtures in an unreacted state for extended periods of time at room temperature has proven to be an intractable problem and a particularly serious drawback for silicone elastomer compositions which cure by this reaction.

One method that has been used to overcome this disadvantage involves use of a hydrosilylation catalyst in the form of a powder made from a mixture of the catalyst and a thermoplastic resin.

For example, U.S. Pat. No. 4,481,341, which issued to Schlak et al on Nov. 6, 1984 describes preparation of a powdered hydrosilation catalyst composition with an inhibited catalytic activity for hydrosilylation reactions by grinding or pulverizing a mixture of a hydrosilylation catalyst and a thermoplastic resin.

Japanese published application no. 53/41,707 teaches a similar resin-encapsulated hydrosilylation catalyst where the resin is a silicone resin. Laid open Japanese application number 58/37053 proposes blending a powder containing a hydrosilylation catalyst and a silicone resin into curable organosiloxane elastomer compositions.

While the methods described in the aforementioned prior art are effective when applied to catalysts with relatively low activities, these methods have not been effective in inhibiting the catalyst activity of highly active hydrosilylation catalysts.

An additional disadvantage of silicone resin-encapsulated catalysts prepared by grinding and pulverization is the difficulty of obtaining a spherical morphology for the silicone resin powder. In particular, it is difficult to obtain spherical particles below about 10 micrometers in diameter. As a result of these problems, the silicone resin powder prepared by grinding and/or pulverization cannot be homogeneously dispersed in a curable composition. The use of this type of silicone resin powder as a curing catalyst for silicone elastomer compositions therefore has the fatal shortcoming of an incomplete crosslinking reaction.

Methods for solving the problems associated with resin-encapsulated catalysts prepared by grinding or pulverization are described in Laid Open Japanese Patent Applications 64/45468, 64/47442, 64/51140 and 02/4833. The teaching in these references can be summarized as two approaches. The first approach comprises preparing a solution of the hydrosilylation reaction catalyst and thermoplastic resin. The solvent selected should be able to dissolve the other two ingredients and is compatible with these ingredients. This solution is emulsified in an aqueous surfactant solution. The solvent is then removed by evaporation to yield a thermoplastic resin powder containing the hydrosilylation-reaction catalyst.

In accordance with the second approach taught by the prior art, a powdered resin containing a hydrosilylation catalyst is prepared according the first method and then washed with a solvent which can dissolve the hydrosilylation catalyst but not the thermoplastic resin. This produces a powder in which the catalyst has been removed from the surface and near-surface of the thermoplastic resin particles.

The first method can in fact produce a microparticulate powder with an average particle diameter of 10 micrometers or less, making possible a complete and thorough crosslinking reaction in silicone elastomer compositions. The second method inhibits catalytic activity even for highly active hydrosilylation catalysts. Resin encapsulated catalysts prepared using either of these two methods can be incorporated into curable compositions that can be stored for long periods of time at room temperature after all the ingredients have been mixed. The substantial time and labor required for the production of the desired powdered resin/catalyst mixture using these two methods increases the cost of implementing these methods on an industrial scale. Moreover, the microparticulate powder produced by these methods is prone to aggregation, which hinders its homogeneous dispersion throughout a curable organosiloxane composition.

The present method was developed as the result of extensive research by the present inventors directed to solving the problems associated with prior art resin-encapsulated hydrosilylation catalysts. One objective of the present invention is providing a highly productive method for preparing a resin-encapsulated hydrosilylation catalyst in the form of microparticles that can be efficiently used as a hydrosilylation-reaction catalyst. The activity of the catalyst is only evident at temperatures equal to or above the softening point of the thermoplastic resin.

SUMMARY OF THE INVENTION

The objectives of this invention are achieved by providing a novel method for preparing microparticles of a resin-encapsulated hydrosilylation reaction catalyst. The method involves first preparing a solution consisting essentially of a thermoplastic resin having a softening point or glass transition temperature of from 40° to 200° C., a hydrosilylation catalyst and a volatilizable solvent and then spraying this solution into a stream of heated gas in order to concurrently volatilize the solvent from the droplets and solidifying the thermoplastic resin into a microparticulate form while solution is in the form of droplets and entrained in the gas stream.

DETAILED DESCRIPTION OF THE INVENTION

This invention provides a method for preparing microparticles of a thermoplastic resin containing an encapsulated hydrosilylation catalyst, said method comprising the steps of
(1) dissolving said hydrosilylation catalyst and thermoplastic resin in a quantity of a volatilizable liquid sufficient to achieve a solution exhibiting a viscosity suitable for spraying, where the softening point or glass-transition temperature of said resin is from 40 to 200 degrees Centigrade,
(2) blending said solution in the form of a spray into a current of a heated inert gas, wherein said liquid is volatilized from the individual droplets that constitute said spray concurrently with solidification of said resin to form discrete microparticles during entrainment of the droplets in said current, and
(3) recovering said microparticles.

The Hydrosilylation Catalyst

The only requirement of the hydrosilylation catalyst used in the present method is that it exhibit catalytic activity in the desired application. No particular restrictions are otherwise placed on the type of catalyst selected.

Examples of typical hydrosilylation catalyst include but are not limited to platinum-containing catalysts such as chloroplatinic acid, alcohol-modified chloroplatinic acid, platinum/olefin complexes, chloroplatinic acid/diketone complexes, complexes between vinylsiloxane and platinum or chloroplatinic acid, platinum black, and platinum supported on alumina, silica and carbon black; palladium catalysts such as tetrakis(triphenylphosphine)palladium; as well as complex catalysts of rhodium, nickel, and cobalt.

Of these catalysts, the platinum-containing catalysts are preferred based on their high catalytic activity, with platinum/vinylsiloxane complexes being particularly preferred. While these catalysts may be used neat, they can also be used in the form of a composition prepared by dissolving the catalyst in a liquid capable of solubilizing the catalyst. Platinum/vinylsiloxane complexes are preferably used in the form of a solution in a polysiloxane which is liquid at ambient temperature.

The Thermoplastic Resin

The thermoplastic resin used to encapsulate the hydrosilylation catalyst must have a softening point or glass-transition temperature within the range of 40 to 200 degrees Centigrade. So long as this condition is satisfied and the resin does not poison or otherwise adversely affect the activity of the hydrosilylation catalyst, any of the known thermoplastic resins can be used.

The softening point of a resin is typically the temperature at which the resin begins to flow under the effect of its own weight or its spontaneous surface tension. This temperature is readily measured by microscopic observation of the ground thermoplastic resin particles while heating the particles at a constant rate. The glass-transition point can be measured using differential scanning calorimetry (DSC).

The present method utilizes thermoplastic resins which have either a softening or glass-transition temperature in the range of from 40 to 200 degrees Centigrade. Examples of suitable thermoplastic resins include but are not limited to silicone resins, polysilane resins, acrylic resins, polystyrene resins, and methyl cellulose.

The thermoplastic resin is preferably a silicone resin or acrylic resin when the thermoplastic resin microparticles will be used as a curing catalyst for silicone elastomer compositions.

The Solvent

In accordance with the present method the hydrosilylation catalyst and a suitable thermoplastic resin are dissolved in a liquid capable of solubilizing both of these materials to yield a solution in which the molecules of catalyst and resin are homogeneously blended.

Suitable solvents must be capable of dissolving both the catalyst and resin without poisoning or otherwise adversely affecting the activity of the catalyst, and are sufficiently volatile to evaporate quickly when the solution is subsequently projected as droplets into a current of heated gas. The boiling point of the solvent is preferably from 30° to 250° C. to avoid decomposing either the hydrosilylation catalyst or the thermoplastic resin.

In order to produce spherical microparticles, it is advantageous to dissolve the resin and catalyst in a mixture of two solvents whose boiling points differ by at least 50 degrees Centigrade. Mixtures containing at least 50 volume percent of the lower boiling solvent are particularly preferred.

The relative concentrations of hydrosilylation catalyst and thermoplastic resin in the solution are determined by the concentration of catalyst desired in the final microparticles. For example, when a metal or a compound of the metal is used as the hydrosilylation catalyst, the concentration of this catalyst in the thermoplastic resin portion of the microparticle, based on the metal portion of the catalyst, is preferably from 0.01 to 5 weight percent.

The amount of solvent used in preparing the solution should be sufficient to achieve a homogenous solution with a viscosity that will allow the solution to be sprayed during the next step of the present method.

Formation of the Microparticles

The final step of the present method involves spraying the solution containing the thermoplastic resin and hydrosilylation catalyst into a current of heated gas in order to volatilize the solvent and recovering the resultant microparticles. To achieve the desired spherical morphology the thermoplastic resin must be solidified while the sprayed material is still entrained in the gas stream in the form of discrete droplets.

No particular restriction is placed on the spraying method as long as it can convert the solution into finely divided liquid droplets. Such spraying methods are exemplified by (1) letting the solution of resin and catalyst fall onto a rapidly rotating disk in order to obtain a microparticulated spray due to the resultant centrifugal force, (2) ejecting the solution together with the gas under superatmospheric pressure through a suitable nozzle, and (3) spraying methods in which the solution is microparticulated by ultrasound.

A preferred method consists of ejecting a mixture of solution and heated gas through a spray nozzle generally referred to as a dual-fluid nozzle, and causing the microparticulate droplets sprayed from two directions to collide in order to produce even smaller droplets.

The temperatures of the spray and the heated gas current, and the velocity of the gas current should be selected to minimize the cost of the process while avoiding fusion and/or aggregation of the solid particles and decomposition of the hydrosilylation catalyst. While these three parameters cannot be specifically restricted, the temperature of the solution and the gas stream will generally fall within the range from room temperature to the softening point of the thermoplastic resin, that is, within the range from 40° to 200° C.

Furthermore, when the flammability of the solvent is sufficient to increase the risk of an explosion or there is risk arises of a dust explosion involving the microparticles, it is advantageous to use a gas whose oxygen concentration is below that of the air, and in particular a gas whose oxygen concentration does not exceed 10 volume percent.

The solvent is evaporated from the sprayed liquid microdroplets in the region in which the microdroplets are entrained within the hot gas current, thereby forming a microparticulate solid. Because the temperature of the hot gas stream decreases in the region between the locations of solution spraying and product recovery due to the heat released from the system by solvent evaporation, the gas flow rate and the temperature of the hot gas flow at the point of injection must be adjusted to prevent condensation of the volatilized solvent in the region between the injection point and the point of product collection.

The hydrosilylation catalyst-containing thermoplastic resin microparticles produced in accordance with the present method can be recovered by methods such as use of a cyclone or filter or by blowing the microparticles into a fluid. Moreover, microparticles which are too large and too small can be removed through the use of two or more collection devices operating under different collection conditions. For example, in order to obtain microparticles with particle diameters in the range of 0.01 to 10 micrometers, it is preferable to first remove microparticles with diameters larger than 10 micrometers using a cyclone, then recover the desired microparticles using a bag filter, and finally dispose of microparticles smaller than 0.01 micrometers by blowing the gas stream into a liquid.

The hydrosilylation catalyst-containing thermoplastic resin microparticles obtained according to the present method preferably have an average particle diameter within the range of from 0.01 to 10 micrometers. When value falls below 0.01 micrometers, the yield of recovered microparticles declines and the ability of the microparticles to inhibit the activity of the hydrosilylation catalyst at temperatures below the softening or glass transition temperature of the resin also deteriorates. An unsatisfactory level of catalytic activity begins to appear when the particle diameter exceeds 10 micrometers.

The microparticles are preferably spherical in shape because this shape facilitates highly reproducible manufacture of thermoplastic microparticles with stable properties in terms of activity inhibition at temperatures below the softening or glass transition temperature of the thermoplastic resin and activity of the catalyst above this temperature.

The concentration of hydrosilylation catalyst in the present microparticles is preferably from 0.01 to 5 weight percent, calculated on the basis of the metal content of the catalyst.

When catalyst-containing microparticles prepared in accordance with the present method are used as the curing catalyst for a composition that cures by a hydrosilylation reaction, such a composition can be stored for long periods of time at room temperature following which curing an still be promptly initiated by the application of sufficient heat to soften the resin. As a result, these microparticles are particularly suitable for use as a curing catalyst in thermosetting silicone elastomer compositions which cure by a hydrosilylation reaction.

EXAMPLES

The following examples describe preferred embodiments of the present method and catalyst-containing microparticles prepared using this method. The examples also compare the performance of these microparticles in curable organosiloxane compositions with the performance of microparticles prepared using prior art methods. These examples should not be interpreted as limiting the scope of the present invention as defined in the accompanying claims. Unless otherwise specified all parts and percentages are by weight and viscosities were measured at 25° C.

Reference Example 1

Preparation of a platinum/vinylsiloxane complex composition

6 Grams of an aqueous solution of chloroplatinic acid containing 33 weight percent platinum and 16 g of 1,3-divinyltetramethyldisiloxane were dissolved in 35 g isopropyl alcohol. 10 Grams sodium bicarbonate were added to this solution, and the ingredients in the resulting suspension were reacted by stirring the suspension for 30 minutes while maintaining the temperature from 70° to 80° C. The isopropyl alcohol and water were then evaporated by heating the suspension at 45° C. under a pressure of 50 mm of mercury. The solids were then filtered off to yield a 1,3-divinyltetramethyldisiloxane solution containing 8.5 weight percent, based on platinum, of a platinum/vinylsiloxane complex catalyst.

Reference Example 2

Preparation of thermoplastic silicone resin

A solution was prepared by blending 332 g phenyltrichlorosilane, 53 g dimethyldichlorosilane, and 110 g diphenyldichlorosilane, all of which were solubilized in 150 g toluene. This mixture of silanes was hydrolyzed by dripping the solution into a liquid prepared by combining 430 g toluene, 142 g methyl ethyl ketone, and 114 g water. The resulting reaction mixture was washed with water to remove the hydrogen chloride, following which the organic phase was isolated and stripped of methyl ethyl ketone by heating. Potassium hydroxide (0.2 g) was then added to the organic phase followed by heating and distillation of the resultant water. The reaction mixture was then neutralized with acetic acid and washed repeatedly with water. Complete removal of the solvent yielded a thermoplastic silicone resin having a glass-transition temperature of 65° C. and a softening point of 85° C.

EXAMPLE 1

The following ingredients were introduced into a stirrer-equipped glass reactor and mixed to homogeneity: 900 g of the thermoplastic silicone resin prepared as described in Reference Example 2, 500 g toluene, and 4,600 g dichloromethane. This was followed by the introduction of 44.4 g of the platinum/vinylsiloxane complex composition prepared as described in Reference Example 1. The resultant mixture was stirred to yield a homogeneous solution of the platinum/vinylsiloxane complex and thermoplastic silicone resin. This solution was continuously sprayed through a dual-fluid nozzle into the chamber of a spray dryer obtained from Ashizawa Nitro Atomizer Company, Limited, through which a current of heated nitrogen was directed. The temperature of the nitrogen was 95° C. at the spray dryer's inlet and 45° C. at the spray dryer's outlet, and the nitrogen flow rate flow rate was 1.3 m$^3$/min. After 1 hour of operation, 450 g of silicone resin microparticles containing the platinum/vinylsiloxane complex composition had been recovered using a bag filter. These microparticles had an average particle diameter of 1.1 micrometers and contained 0.5 weight percent of microparticles with diameters of 5 micrometers or greater. The microparticles contained 0.4 weight % platinum, and the spherical shape of the microparticles was confirmed by examination using a scanning electron microscope.

EXAMPLE 2

Microparticles were prepared as described in Example 1, with the exception that the thermoplastic silicone resin was replaced with a methyl methacrylate/butyl methacrylate copolymer available as Elvacite(R) 2013 from E. I. DuPont de Nemours and Co. The resin exhibited a glass-transition temperature of 80° C. and a softening point of 115° C. Operation of the spray drier for 1 hour yielded 510 g of methyl methacrylate/butyl methacrylate copolymer microparticles containing the platinum/vinylsiloxane complex composition.

The microparticles had an average particle diameter of 2.5 micrometers, with 2.0 weight percent having a diameter of at least 10. The microparticles contained 0.39 weight % platinum, and their spherical morphology was confirmed by scanning electron microscopy.

EXAMPLE 3

Silicone resin microparticles containing the platinum/vinylsiloxane complex described in Reference Example 1 were prepared as described in Example 1, with the exception that 5,100 g dichloromethane were used in place of the toluene/dichloromethane mixture of Example 1. Operation of the spray drier for 1 hour yielded 420 g of microparticles. The average diameter of the microparticles was 1.3 micrometers, with 1.2 weight percent being at least 5 micrometers in diameter.

The microparticles contained 0.39 weight percent platinum and were confirmed by scanning electron microscopy to be porous spheres.

EXAMPLE 4

Methyl methacrylate/butyl methacrylate copolymer microparticles containing the platinum/vinylsiloxane complex composition of Reference Example 1 were prepared as described in Example 2, with the exception that 5,100 g dichloromethane were used in place of the toluene/dichloromethane mixture. Operation of the spray drier for 1 hour yielded 490 g of microparticles having an average particle diameter of 2.1 micrometers and containing 1.5 weight percent of microparticles with diameters of at least 10 micrometers. These microparticles contained 0.4 weight percent of platinum.

The microparticles were confirmed by scanning electron microscopy to have a cubic to spherical shape and substantial surface roughness.

Comparison Example 1

A solution was prepared by mixing 40 g of the platinum/vinylsiloxane complex composition described in Reference Example 1, 320 g of the thermoplastic silicone resin described in Reference Example 2, and 6,600 g dichloromethane. This solution was added to an aqueous solution containing 15 g polyvinyl alcohol, and an emulsion was prepared from the resultant mixture by subjecting it to a high shear rate. The dichloromethane was then gradually evaporated off over 48 hours at room temperature under a current of nitrogen, and the solid microparticles that precipitated were recovered by centrifugation. The recovered microparticles were washed twice with water, followed by two washings with methanol, and two with hexamethyldisiloxane, after which the microparticles were dried for 2 days at 40 degrees Centigrade. The yield was 305 g of microparticles having an average diameter of 1.0 micrometer. The microparticles contained 0.38 percent platinum, and 0.5 weight percent of themicroparticles were at least 5 micrometers in diameter. The spherical shape of the microparticles was confirmed by scanning electron microscopy.

Preparation of the microparticles required about four days, from preparation of the emulsion to the completion of the final drying.

EXAMPLE 5

This example describes the evaluation as hydrosilylation catalysts of the catalyst-containing resin microparticles prepared in Examples 1 to 4 and Comparison Example 1.

20 Grams hexamethyldisilazane-hydrophobicized fumed silica was thoroughly mixed into 100 g of an alpha, omega-divinylpolydimethylsiloxane exhibiting a viscosity of 1,500 cp (1.5 Pa.s). This was followed by the addition with mixing to homogeneity of 0.01 g phenylbutynol and 2.8 g of an organohydrogenpolysiloxane with the average molecular formula Me$_3$SiO(Me$_2$SiO)$_3$.(MeHSiO)$_5$SiMe$_3$.

Thermosetting organopolysiloxane compositions were then prepared by adding to separate portions of the resultant mixture one of the types of catalyst-containing microparticles prepared as described in the preceding Examples 1 to 4 and Comparison Example 1. The amount of microparticles in each composition was equivalent to a platinum content of 5 ppm in the final curable composition.

The curing properties of these curable compositions were then measured at 150 degrees Centigrade using a Curastometer Model 3 obtained from Toyo Baldwin Kabushiki Kaisha. The curing properties measured were the curing initiation time ($I_t$) and the time required for the torque applied by the Curastometer to reach 90% of its maximum (T$_{90}$).

A portion of each curable composition was stored for one year at 25° C., at which time the curing properties were again measured. The results of these measurements are also reported in Table 1.

With regard to the curable organopolysiloxane compositions containing as the curing catalyst one of the hydrosilylation catalyst-containing thermoplastic resin microparticles prepared according to the present method, the cure rate measurements confirmed that in all cases these compositions could be stored for a long period of time at room temperature, yet cured completely within a few minutes at 150 degrees Centigrade.

TABLE 1

| Property | Examples | | | | Comp. Example |
| --- | --- | --- | --- | --- | --- |
|  | 1 | 2 | 3 | 4 | 1 |
| Immediately After Preparation |  |  |  |  |  |
| $I_t$ (seconds) | 29.1 | 42.7 | 30.5 | 40.9 | 28.5 |
| $T_{90}$ (seconds) | 33.5 | 49.5 | 34.1 | 48.1 | 33.1 |
| After 1 year |  |  |  |  |  |
| $I_t$ (seconds) | 28.1 | 41.1 | 28.2 | 40.1 | 27.7 |
| $T_{90}$ (seconds) | 32.7 | 48.0 | 33.0 | 47.5 | 31.2 |

That which is claimed is:

1. A method for preparing microparticles of a thermoplastic resin containing an encapsulated hydrosilylation reaction catalyst, said method comprising the steps of (1) dissolving a hydrosilylation catalyst and a thermoplastic resin in a quantity of a volatilizable liquid sufficient to achieve a solution exhibiting a viscosity suitable for spraying, where the softening point or glass-transition temperature of said resin is from 40 to 200 degrees Centigrade, and (2) blending said solution in the form of a spray into a current of a heated inert gas, whereby said liquid is volatilized from the individual droplets that constitute said spray concurrently with solidification of said resin to form discrete microparticles during entrainment of the droplets in said current, and (3) recovering said microparticles 2. A method according to claim 1 wherein said hydrosilylation catalyst is a platinum compound, said resin is selected from the group consisting of a silicone resin, polysilane resins, acrylic resins, polystyrene resins and methyl cellulose, the boiling point of said solvent is from 30° to 250° C. and the metal content of said catalyst constitutes from 0.01 to 5 percent of the weight of said microparticle.

3. A method for according to claim 2 where said volatilizable liquid is a mixture of two solvents for said catalyst and said resin, where the boiling points of said solvents differ by at least 50 degrees C.

4. A method according to claim 2 where said resin is a silicone resin or an acrylic resin, said solvent comprises a low-boiling solvent with a boiling point of 30 to 200 degrees Centigrade in combination with a high-boiling solvent whose boiling point is at least 50 degrees Centigrade higher than that of said low-boiling solvent the temperature of said inert gas is from 40 to 200 degrees C., the oxygen concentration in said gas current does not exceed 10 volume percent, and the diameter of said microparticles is from 0.01 to 10 micrometers.

5. A method according to claim 1 where said microparticles have an average particle diameter within the range of 0.05 to 5 micrometers and contain no more than 5 weight percent of microparticles with a diameter of at least 5 micrometers, said mixture contains at least 50 volume percent of the lower boiling solvent, the boiling point of said solvent is from 40° to 200° C., and said platinum compound is a platinum/alkenylsiloxane complex.

* * * * *